US008469779B1

(12) United States Patent
Hayzlett et al.

(10) Patent No.: US 8,469,779 B1
(45) Date of Patent: Jun. 25, 2013

(54) METHOD FOR DEBRISTLING ANIMAL SKIN

(75) Inventors: Mark Hayzlett, Flemington, NJ (US);
Abhijit Nag, Stewartsville, NJ (US)

(73) Assignee: LifeCell Corporation, Branchburg, NJ (US)

( * ) Notice: Subject to any disclaimer, the term of this patent is extended or adjusted under 35 U.S.C. 154(b) by 598 days.

(21) Appl. No.: 12/650,810

(22) Filed: Dec. 31, 2009

Related U.S. Application Data

(60) Provisional application No. 61/142,310, filed on Jan. 2, 2009.

(51) Int. Cl.
*A22B 5/08* (2006.01)
(52) U.S. Cl.
USPC .......................................................... 452/72
(58) Field of Classification Search
USPC .................................................... 452/71–91
See application file for complete search history.

(56) References Cited

U.S. PATENT DOCUMENTS

| 2,820,246 | A | * | 1/1958 | Thomas | 452/77 |
|---|---|---|---|---|---|
| 4,309,795 | A | * | 1/1982 | Simonsen | 452/76 |
| 4,770,010 | A | * | 9/1988 | Cots Tana et al. | 69/22 |
| 5,149,295 | A | | 9/1992 | Bowling et al. | |
| 5,163,288 | A | * | 11/1992 | Doley | 606/133 |
| 5,291,636 | A | * | 3/1994 | Knight | 19/2 |
| 5,651,730 | A | * | 7/1997 | McGinnis et al. | 452/74 |
| 5,669,916 | A | | 9/1997 | Anderson | |
| 5,853,320 | A | * | 12/1998 | Wathes et al. | 452/88 |
| 5,882,253 | A | * | 3/1999 | Mostoller | 452/173 |
| 5,939,115 | A | * | 8/1999 | Kounev et al. | 426/238 |
| 6,478,493 | B1 | | 11/2002 | Cepeda et al. | |
| 6,478,494 | B1 | | 11/2002 | Eckl et al. | |
| 6,478,496 | B1 | | 11/2002 | Yoshii et al. | |
| 6,478,497 | B2 | | 11/2002 | Villahoz | |
| 6,478,498 | B1 | | 11/2002 | Miyasaka et al. | |
| 7,981,112 | B1 | * | 7/2011 | Neev | 606/27 |
| 2001/0014579 | A1 | | 8/2001 | Potter et al. | |
| 2002/0031994 | A1 | | 3/2002 | Potter et al. | |
| 2002/0173260 | A1 | | 11/2002 | Potter et al. | |
| 2003/0073399 | A1 | | 4/2003 | Potter et al. | |
| 2007/0208354 | A1 | | 9/2007 | Barraclough et al. | |
| 2007/0225733 | A1 | | 9/2007 | Barraclough et al. | |

FOREIGN PATENT DOCUMENTS

EP 1 534 098 B1 6/2006
WO WO 2005/002387 A1 1/2005

* cited by examiner

*Primary Examiner* — Richard Price, Jr.
(74) *Attorney, Agent, or Firm* — Finnegan, Henderson, Farabow, Garrett & Dunner, LLP

(57) ABSTRACT

A variety of compositions and methods for removing hair from animal skin are disclosed. The methods can include heating the skin and applying force to the skin to remove hair. The methods can further include applying an adhesive comprising a wax and a resin to the skin, allowing the adhesive to solidify, and applying force to the adhesive.

10 Claims, 6 Drawing Sheets

METHOD FOR DEBRISTLING ANIMAL SKIN

This application claims priority under 35 U.S.C. §119 to U.S. Provisional Patent Application No. 61/142,310, which was filed on Jan. 2, 2009, and is herein incorporated by reference in its entirety.

The present disclosure relates generally to preparing animal skin, and more particularly, to a method for removing hair or bristle from animal skin.

Animal skin can be used for a variety of medical applications, including the production of tissue matrices or other grafts for repair, regeneration, and/or augmentation of human tissues. In many cases, it is desirable to remove bristle or hair from animal skin as part of the production of grafts or implants derived from the skin. However, removal of the hair or bristle should not damage or alter the skin in such a way that the desired mechanical, biological, or chemical properties are not present in the final implant or graft materials. Accordingly, methods for removing hair or bristle from animal skin are needed.

SUMMARY

In some embodiments, a method of removing hair or bristles from an animal skin is provided. The method comprises heating the skin and applying friction to the skin in an area of the skin containing hair or bristle to remove the hair or bristle from the skin, wherein the skin is heated to a temperature range that allows the hair or bristle to be removed by friction, but has a maximum temperature and heating time that does not damage the dermal extracellular matrix of the skin.

In some embodiments, an adhesive composition is provided. The adhesive composition comprises about 15% to about 20% by weight of a polyether and about 80% to about 85% by weight of a polyamide. In some embodiments, a method for removing hair or bristle from an animal skin is provided. The method comprises providing an animal skin containing hair or bristle on a surface of the skin, contacting the at least one surface with the adhesive, and applying a force to the adhesive to remove at least part of the adhesive composition to remove at least part of the hair or bristle from the skin.

All publications, patent applications, patents and other references mentioned herein are incorporated by reference in their entirety. The materials, methods, and examples disclosed herein are illustrative only and not intended to be limiting. Other features and advantages of the invention, e.g., methods for debristling animal skin, will be apparent from the following description, from the drawings and from the claims.

BRIEF DESCRIPTION OF THE DRAWINGS

The accompanying drawings, which are incorporated in and constitute part of this specification, illustrate several embodiments of the invention and together with the description, serve to explain the principles of the invention.

DETAILED DESCRIPTION

Figure 1A:
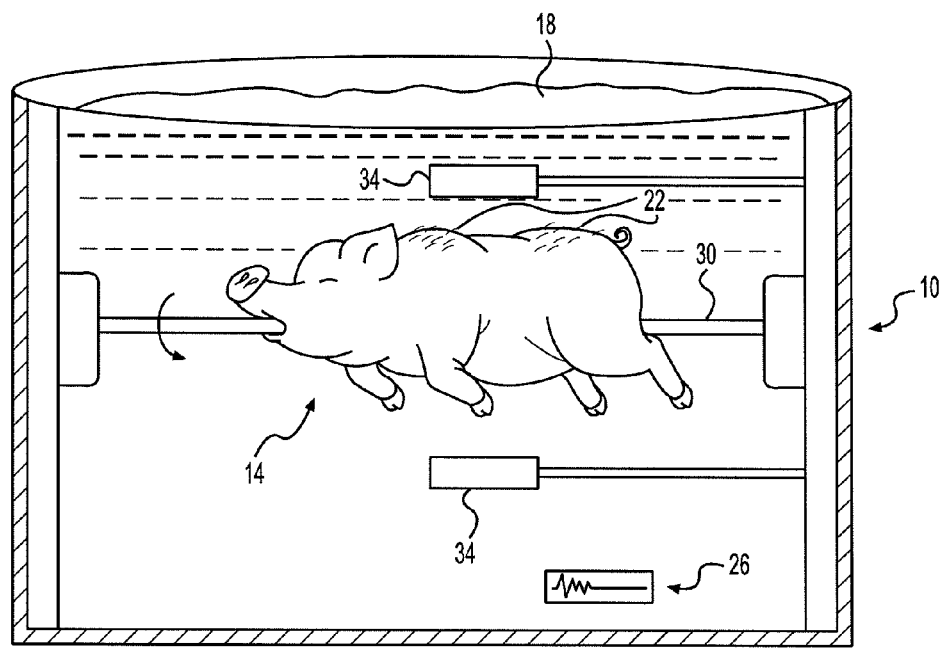
FIG. 1A is a system for removing hair or bristle from an animal's skin, according to certain embodiments.

Reference will now be made in detail to the certain exemplary embodiments according to the present disclosure, certain examples of which are illustrated in the accompanying drawings. Wherever possible, the same reference numbers will be used throughout the drawings to refer to the same or like parts.

In this application, the use of the singular includes the plural unless specifically stated otherwise. In this application, the use of "or" means "and/or" unless stated otherwise. The use of the term "portion" may include part of a moiety or the entire moiety.

The section headings used herein are for organizational purposes only and are not to be construed as limiting the subject matter described. All documents, or portions of documents, cited in this application, including but not limited to patents, patent applications, articles, books, and treatises, are hereby expressly incorporated by reference in their entirety for any purpose.

As used herein, the terms "hair" and "bristle" may be used interchangeably. "Hair" and "bristle" will be understood to mean animal hair, whiskers, fur, or any other hair-like structure present on animal skin.

The term "animal skin" will be understood to refer to a portion or all of an animal's skin, including a portion or all of an animal's dermal and epidermal layers, whether still attached to a part or all of the animal's body, or after having been removed from the animal's body. "Animal skin" may be used interchangeably with "animal hide."

In some embodiments, the present disclosure provides a method and apparatus for removing hair or bristle from animal skin. In some embodiments, the method can include changing the temperature of the animal skin and applying force to the hair or bristle to remove the hair or bristle from the animal skin. In some embodiments, the force is applied by applying friction to the skin at a region of the skin containing hair or bristle. In some embodiments, the skin is heated to a temperature range that allows the hair or bristle to be removed by friction, but has a maximum temperature and heating time that does not damage the extracellular matrix of the skin.

In some embodiments, the present disclosure provides an adhesive composition that can be used to remove hair from animal skin. In some embodiments, the adhesive comprises a wax component and a resin component. In some embodiments, the adhesive composition can include a polyether and a polyamide. In some embodiments, the about of the wax component and the amount of the resin component will be selected to produced certain properties. In some embodiments, the amount of the wax and resin is selected to allow blending of the wax component with the resin component. In some embodiments, the amount of the wax and resin is selected to provide sufficient mechanical strength when solid to remove hair or bristle, but to allow sufficient flexibility to apply the molten material to the skin at a temperature that does not damage the skin and to allow the material to be pulled from the skin. In certain embodiments, the present disclosure provides methods for removing hair from animal skin including applying an adhesive to the skin, allowing the adhesive to solidify, and removing the adhesive by applying mechanical force to the adhesive.

In certain embodiments, the present disclosure provides methods for removing hair from animal skin including heating the animal skin to a desired temperature and applying force to the hair or bristle to remove the hair or bristle from the animal skin, followed by applying an adhesive to the skin, allowing the adhesive to solidify, and removing the adhesive by applying mechanical force to the adhesive. In certain embodiments, the present disclosure provides methods for removing hair from animal skin including applying an adhesive to the skin, allowing the adhesive to solidify, and removing the adhesive by applying mechanical force to the adhesive, followed by heating the animal skin to a desired temperature and applying force to the hair or bristle to remove the hair or bristle from the animal skin.

The animal skin can be derived from a variety of different animals, depending on the type of graft to be produced. In some embodiments, the animal can include a pig, the skin of which may be used to produce porcine dermal tissue matrices. However, the methods of the present disclosure can be used to remove hair or bristle from any mammalian source.

Figure 1B:
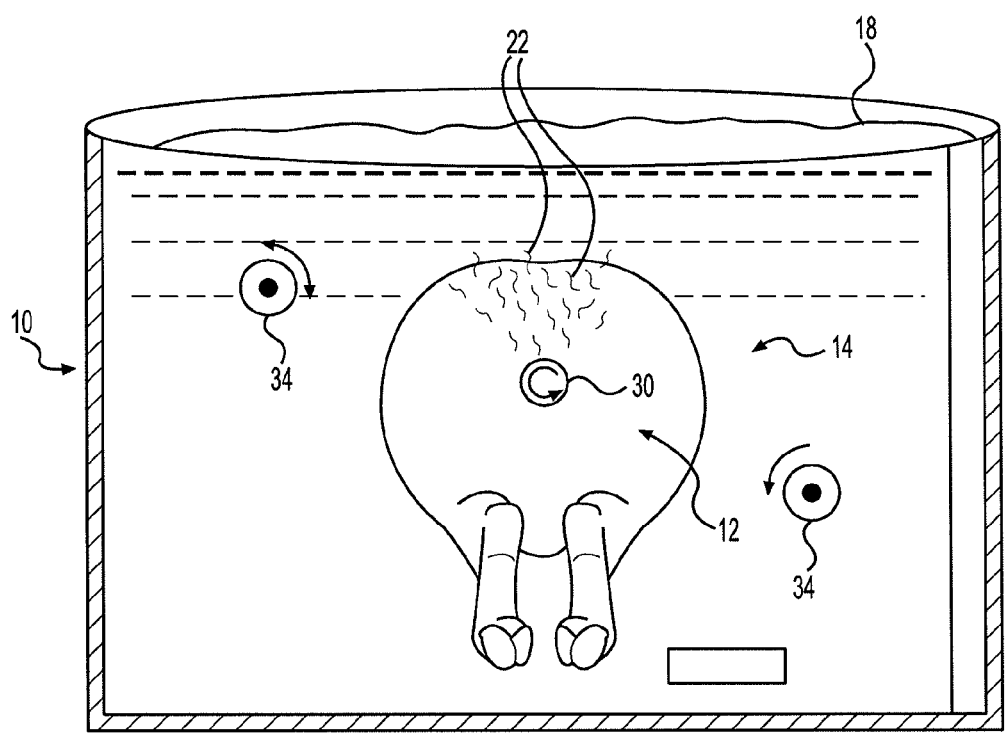
FIG. 1B is a side-end view of the system for removing hair or bristle from an animal's skin, according to certain embodiments.

FIG. 1A is a system for removing hair or bristle from an animal's skin, according to certain embodiments, and FIG. 1B is a side-end view of the system for removing hair or bristle from an animal's skin, according to certain embodiments. In some embodiments, the system includes a chamber 10 that can be used to control the temperature of the skin 12 of an animal 14 from which hair 22 is to be removed. As shown, the entire animal 14 may be placed in the chamber 10 during hair removal. In some embodiments, only a portion of the animal 14 may be placed in the chamber. In certain embodiments, the skin 12 or a portion of the skin 12 may be removed from the animal's body and may be placed in the chamber during hair removal.

In some embodiments, the temperature inside the chamber 10 is controlled to heat the skin 12 to a temperature range that allows the hair 22 or bristle to be removed by applying force to the hair 22, but has a maximum temperature and heating time that does not damage the dermal extracellular matrix of the skin. In some embodiments, the skin is heated to a temperature between about 53° C. and about 56° C. In some embodiments, the skin is heated to a temperature between about 53° C. and about 56° C. for a maximum of about 15 minutes. In some embodiments, the skin is heated to a temperature between about 53° C. and about 56° C. for a maximum of about 15 minutes. In certain embodiments, the skin is heated to about 54° C. for about 10 minutes. In certain embodiments, the skin is heated to no more than 60° C.

In some embodiments, the chamber 10 can be filled with a fluid 18, such as water, and the temperature of the fluid can be controlled to heat the skin 12 to the desired temperature for hair removal. In some embodiments, the skin 12 is submerged in the fluid after the temperature of the fluid is at the desired temperature. In some embodiments, the entire animal body or a portion of the animal body attached to the portion of skin that will be used to make a tissue graft or implant will be submerged in the fluid.

The temperature of the chamber 10 can be controlled using a number of methods. In some embodiments, a heater 26 is in fluid communication with the chamber 10 and controls the temperature of the interior of the chamber 10 or fluid 18 within the chamber 10. In some embodiments, the heater is configured to include a feedback mechanism to allow automatic control of the temperature within the chamber to a desired temperature range.

In some embodiments, isolated portions of animal skin may be heated to a desired temperature. For example, in various embodiments, a portion of the animal skin can be heated by applying heat from an external source (e.g., air or light) to heat a portion of the skin, without submerging the skin in a chamber. Force can be applied to hair or bristle located on the skin that is heated.

In some embodiments, after the skin 12 is placed in the chamber and reaches the desired temperature, force can be applied to the hair 22 to remove the hair 22 from the skin 12. In some embodiments, the force is applied by applying friction to the skin 12 in one or more regions containing hair 22. In some embodiments, the animal 14 or skin 12 (if the skin is not attached to a portion of an animal body) is moved within the chamber 10 and is contacted with one or more rollers 34 or other bodies. For example, as shown, the animal 14 can be rotated within the chamber using a rod 30 or other holding mechanism. In some embodiments, the skin 12 contacts the roller 34 during movement, thereby removing the hair 22.

In some embodiments, the rollers 34 may be mobile. For example, as shown in FIG. 1B, the rollers 34 may rotate or move relative to the skin 12, and when in contact with the skin, will apply friction to the skin 12 to remove the hair 22. In some embodiments, both the skin 12 and rollers 34 are moved and/or rotated. In other embodiments, only one of the skin 12 and rollers 34 are moved during hair removal. In some embodiments, the rollers can include a surface that produces friction but does not damage the skin substantially. In various embodiments, the rollers 34 can be produced with surfaces including silicone, felt, polyethylene nap (e.g., paint rollers), aluminum (e.g., splined aluminum), and stainless steel.

Figure 1C:
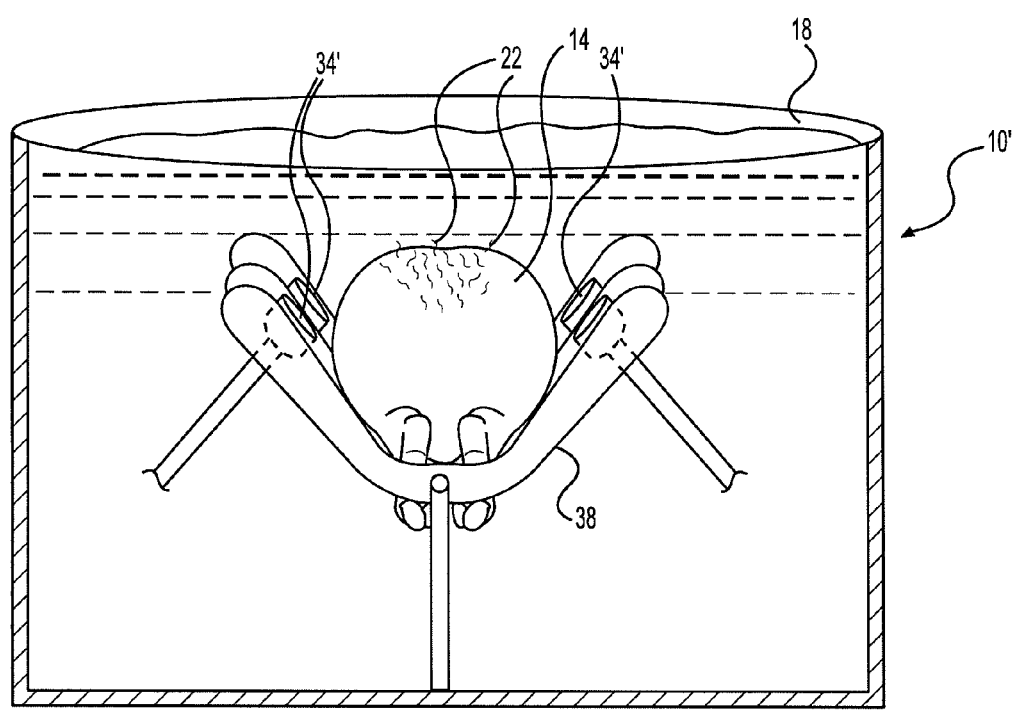
FIG. 1C is a side-end view of the system for removing hair or bristle from an animal's skin, according to certain embodiments.

In other embodiments, the skin 12 or animal 14 can be held in place and or moved within the chamber 10 without causing trauma or damage to the animal's body. For example, FIG. 1C is a side-end view of the system for removing hair or bristle from an animal's skin, according to certain embodiments. As shown, the system again includes a chamber 10' that may be heated to a selected temperature. In some embodiments, the chamber can include a fluid 18 that is heated to a desired temperature. In some embodiments, the skin 12 or animal 14 is placed on a series of slotted supports 38. In some embodiments, the supports 38 can close at least partially onto the animal 14 or skin to hold the animal 14 and skin 12 in place. Further, in some embodiments, the supports may move to move the pig relative to surfaces of rollers 34' or other objects configured to apply force to remove hair 22 or bristle from the skin 12. Alternatively or additionally, in some embodiments, the rollers 34' can move, as described with reference to rollers 34, of FIGS. 1A and 1B. In some embodiments, the rollers 34' will be positioned between the supports 38.

Figure 2:
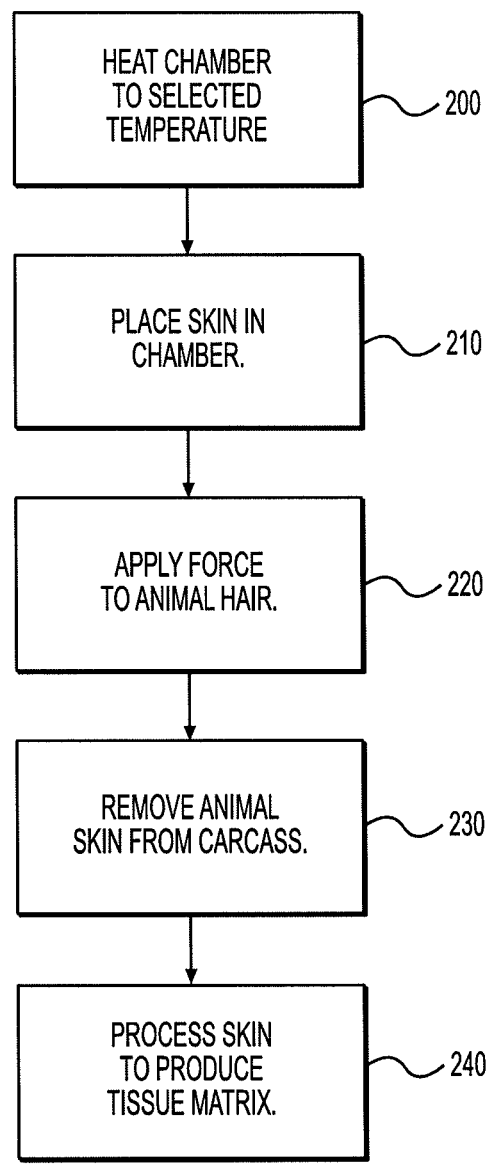
FIG. 2 is a flow chart illustrating a process for removing hair or bristle from an animal's skin, according to certain embodiments.

FIG. 2 is a flow chart illustrating a process for removing hair or bristle from an animal's skin, according to certain embodiments. As described above, the chamber 10, which may contain a liquid 18, is first heated to the desired temperature, as shown at step 200. After heating the interior of the chamber 10 or liquid 18 within the chamber 10, the skin is placed in the chamber 10, as shown at step 210. Next, force is applied to the hair 22 to remove the hair 22 from the skin 12.

As described above, in some embodiments, the hair 22 may be removed while still attached to part or all of the animal 14. In some embodiments, the method is performed using a whole animal carcass. Therefore, in some embodiments, part or all of the skin is removed from the animal carcass after hair removal, as shown at step 230. After hair removal, and subsequent to removal of skin from the carcass, the skin may be processed to produce a decellularized tissue matrix, as shown at step 240.

In some embodiments, the disclosure provides an adhesive composition (for use in removing hair or bristle from a mammalian skin sample) comprising a wax component and a resin component. In certain embodiments, the present disclosure also provides methods for removing hair from animal skin including applying the adhesive to the skin, allowing the adhesive to solidify, and removing the adhesive by applying mechanical force to the adhesive.

In various embodiments, the adhesive composition can have one or more, or all, of the following physical and chemical properties: (i) a wax portion in the adhesive is capable of changing state at a lower temperature (e.g., about 42° C. or less, about 38° C. or less, about 34° C. or less, about 30° C. or less, about 26° C. or less, or about 22° C. or less) than the resin portion alone (about 85° C.), which allows the adhesive to set quickly yet exhibit poor conduction heat transfer characteristics; (ii) the adhesive provides a strong grip on the hair or bristles when the hair or bristles are encased in a solid plastic sheet of the hardened adhesive; (iii) the composition is hydroscopic and thus any moisture latent in the hair or bristles is absorbed by the adhesive; (iv) deposition of an insulating film of water-soluble wax upon the room temperature dermis is automatic and allows for filling of follicle holes with wax where bristles have been removed in previous passes; (v) the adhesive is flexible enough to bend during the removal phase without cracking, resulting in a consistent peeling profile to remove the bristle from the skin on a continuous sheet of cooled adhesive; (vi) the adhesive is compatible with a thick polypropylene mesh (e.g., TENAX Brand ¾" hex (Tenax, Baltimore, Md.)), which allows for augmentation for a first "pull" of bristle from the skin; (vii) the individual components of the adhesive are suitable for use with tissues intended for transplantation surgery; and (viii) the adhesive allows for a thorough method of bristle or hair removal without substantial damage to the dermal layer of the skin. Further, in some embodiments, the adhesive is formed from only biocompatible components, so that any chemicals absorbed by the skin from the adhesive during hair removal are not harmful if left within a graft or implant produced from the skin.

In some embodiments, the wax component of the adhesive can be a polyethyleneglycol (PEG), which can have an average molecular weight of about 600 daltons to about 3000 daltons. For example, a PEG can have an average molecular weight of about 600 daltons, about 800 daltons, about 1450 daltons, about 1500 daltons, about 2000 daltons, about 3000 daltons, or mixtures of any of the foregoing. One exemplary PEG useful in the adhesive solutions is a commercially available PEG, CARBOWAX SENTRY 1450, which is manufactured by the Dow Company.

In some embodiments, the resin component can be a polyamide resin comprising fatty polyamides made by the condensation of functional amines and polybasic acids (which can be obtained from unsaturated vegetable or tree or other plant oil acids or esters). In some embodiments, the resin of the adhesive composition can be a vegetable-oil based nylon such as MACROMELT 6071 or MACROMELT 6072 (Henkel Adhesives Co.).

In some embodiments, the resin in the adhesive can be selected based on its Vicat softening point to molecular weight ratio. As used herein, the "Vicat softening point" (also known as Vicat Hardness) is the determination of the softening point for materials such as polyethylene, which have no definite melting point. It is taken as the temperature at which the specimen can be penetrated to a depth of 1 mm by a flat-ended needle with a 1 square mm circular or square cross-section. An exemplary Vicat softening point is that of Macromelt 6071 or 6072.

In some embodiments, a solvent is added to the adhesive to produce a desired viscosity. For example, a solvent can be applied until the adhesive has a viscosity that allows the adhesive to be applied evenly at the selected temperature, and produced a strong enough adhesive for hair removal.

In some embodiments, an adhesive composition can contain about 15% to about 20% by weight of a PEG and about 80% to about 85% by weight of a vegetable oil-based nylon. For example, an adhesive composition can contain about 15% to about 20% of CARBOWAX SENTRY 1450 and about 80% to about 85% by weight of MACROMELT 6071.

Figure 3:
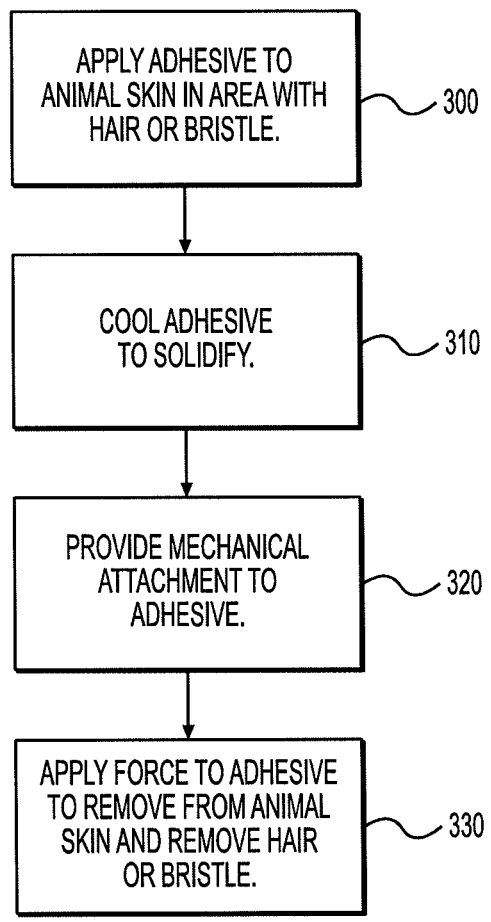
FIG. 3 is a flow chart illustrating a process for removing hair or bristle from an animal's skin, according to certain embodiments.

FIG. 3 is a flow chart illustrating a process for removing hair or bristle from an animal's skin, according to certain embodiments. First, the adhesive is applied to animal skin in an area with hair or bristle, as shown at step 300. The adhesive can be applied at a thickness of about 1 mm to about 3 mm. The adhesive can be applied with a brush, spray, or other technique that allows control of the placement of the adhesive. In some embodiments, the adhesive is applied when heated to a temperature sufficient to melt the adhesive, but low enough to prevent damage or other alteration to the dermal component of the skin.

In certain embodiments, the adhesive can be applied when the adhesive is soft or molten. In certain embodiments, the temperature is selected to allow the adhesive to be applied with a selected method, but having a maximum temperature that will not damage the skin, including the dermis. In some embodiments, the skin is heated to between about 85° C. and about 110° C. In some embodiments, the glue is applied using a brush or other applicator, and may cool somewhat before being applied to the skin. In some embodiments, the glue is applied to the skin when at a temperature below a maximum selected to prevent damage to the skin. In some embodiments, the maximum temperature is between about 90° C. and about 95° C. In some embodiments, the temperature is about 92° C. maximum when contacting the skin.

After the adhesive is applied to the skin, the adhesive is allowed to cool to solidify, as shown at step 310. Then, a mechanical attachment is formed with the adhesive, as shown at step 320, to allow a force to be applied to the adhesive to pull the adhesive from the animal skin, as shown at step 330, thereby removing hair or bristle attached to the adhesive.

In some embodiments, the skin is cooled by using an external cooler. For example, in one embodiment, the skin is cooled by augmented cooling (e.g., cold air) applied to at least one side of the skin. In some embodiments, the skin is cooled by augmented cooling only to the adhesive surface, and not to the skin portion opposite the adhesive (i.e., the dermal portion of the skin). In certain embodiments, a heat sink is not in contact with the portion of the skin facing away from the adhesive because such a heat sink may draw more heat into the skin.

The mechanical attachment can be formed in a number of ways. In some embodiments, an object is contacted with the adhesive while the adhesive is still soft or molten, such that as the adhesive solidifies, the object is embedded in the solidified adhesive. For example, in certain embodiments, a mesh formed of metal or strong flexible wire is placed on top of the adhesive before the adhesive solidifies, and as the adhesive cools, the mesh is embedded in the adhesive. Subsequently, the mesh is pulled from the skin to remove the adhesive and hair or bristle from the skin.

Figure 4:
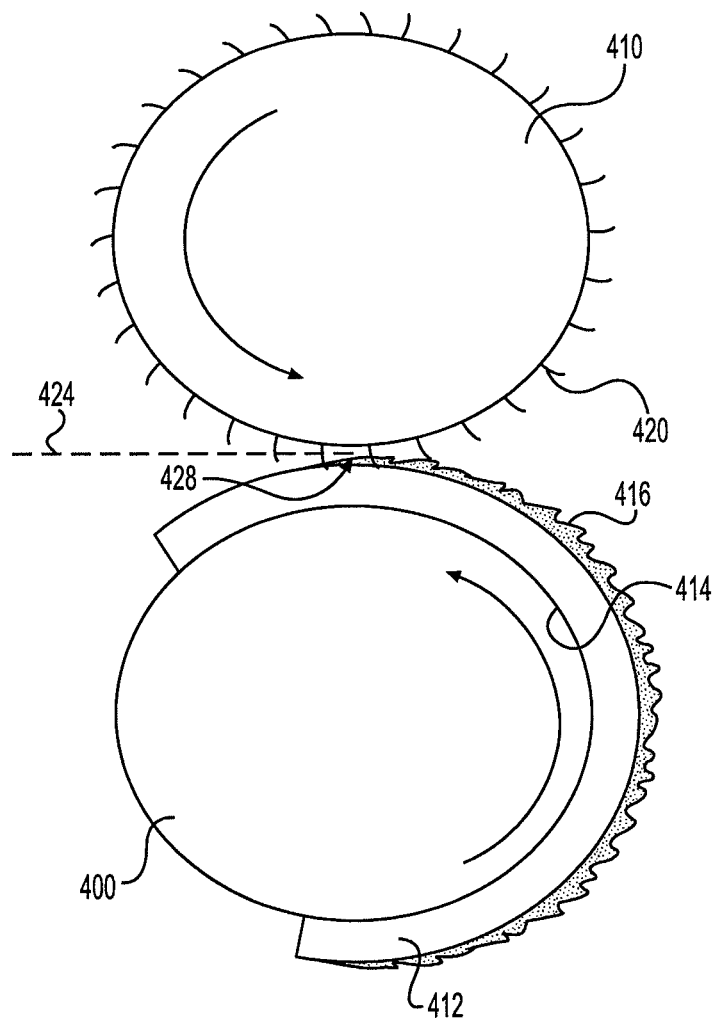
FIG. 4 is a system for removing hair from an animal skin, according to certain embodiments.

In some embodiments, the mechanical attachment can be formed after the adhesive solidifies. For example, FIG. 4 is a system for removing hair from an animal skin, according to certain embodiments. In certain embodiments, the skin 412 is placed on a roller with the dermal side 414 down, and the adhesive 416 facing outwards. The adhesive 416 is aligned with the tangent surface of a second rotating body 410 (e.g., a claw roller) such that the surface 420 of the second body 410 intersects with the apex 424 of the rotating path of the skin, wherein the advancing edge 428 of the cooled adhesive 416 can be rapidly pried away from the skin to thereby remove the hair or bristle from the surface of the skin 412.

In some embodiments, the disclosure provides a method for determining the pliability of a tissue sample (e.g., a skin sample from which the hair or bristle has been removed, e.g., using a method described herein). In some embodiments, the skin is subjected to a fold test, wherein the edge of the bald skin is gently folded over itself. In some embodiments, a fold of about 160° or more indicates a first level of pliability of the bald skin and a fold of less than about 160° indicates a second level of pliability of the bald skin.

Bald skin of the first level of pliability can be used, e.g., for treatment of damaged firm tissues such as, but not limited to bone, cartilage, fascia, or tendon. Bald skin determined to have the second level of pliability can be used, e.g., in the treatment of damaged soft tissues such as, e.g., an organ (e.g., heart) or synovial tissue.

In certain embodiments, the method of removing hair using the adhesive is used in conjunction with the method of heating the animal skin and applying force to the hair. In some embodiments, hair is first removed by heating the animal skin and applying force to the skin, as described above. Subsequently, residual hair is removed using the adhesive composition. In some embodiments, the method of heating and applying force is performed while the skin is still connected to part or all of the animal body. Then, the skin is removed from the animal body, and the adhesive is used to remove residual hair.

As indicated above, skin prepared by any one of or combinations of the methods described above can be processed to produce dermal tissue matrices. The dermal tissue matrices can be used in procedures for tissue repair, regeneration, or augmentation. Various processes for producing tissue matrices are known in the art. Such tissue matrices can include decellularized dermal matrices from which substantially all of the cellular components have been removed. Exemplary processes for producing acellular tissue matrices are described in U.S. Pat. No. 5,366,616 and U.S. patent application Ser. No. 10/896,594. The disclosures of which are incorporated herein by reference in their entirety.

While the present disclosure has been described in conjunction with the detailed description thereof, the foregoing description is intended to illustrate and not limit the scope of the disclosure, which is defined by the scope of the appended claims. Other aspects, advantages, and modifications are within the scope of the following claims.

What is claimed is:

1. A method of removing hair or bristles from an animal skin, comprising:
    heating the skin to a temperature between about 53° C. and about 60° C.;
    applying friction to the skin in an area of the skin containing hair or bristle to remove the hair or bristle from the skin, wherein the skin is heated to a temperature range that allows the hair or bristle to be removed by friction, but has a maximum temperature and heating time that does not damage the dermal extracellular matrix of the skin.

2. The method of claim 1, wherein the skin is heated to between about 53° C. and about 56° C.

3. The method of claim 1, wherein the skin is heated for less than about 11 minutes.

4. The method of claim 2, wherein the skin is heated to about 54° C.

5. The method of claim 1, wherein heating the skin comprises submerging the skin in a liquid that is heated to a desired temperature.

6. The method of claim 5, wherein submerging the skin in the liquid comprises submerging an animal body in the liquid.

7. The method of claim 6, wherein applying friction to the skin comprises rotating the animal body within the liquid and contacting the rotating body with a surface to apply friction to the skin.

8. The method of claim 7, further comprising moving the surface with respect to the skin.

9. The method of claim 1, further comprising applying an adhesive to the skin;
    cooling the adhesive to solidify the adhesive; and
    applying a force to the adhesive to pull the adhesive away from the skin and remove hair or bristle from the skin.

10. An acellular tissue matrix produced by a processing, comprising:
    selecting an animal skin including cellular components;
    removing the hair or bristle from the animal skin using the method of claim 1; and
    removing substantially all of the cellular components from the skin.

* * * * *